US012671073B2

(12) United States Patent
Lee et al.

(10) Patent No.: US 12,671,073 B2
(45) Date of Patent: Jun. 30, 2026

(54) METHOD OF MANUFACTURING SECONDARY BATTERY

(71) Applicant: LG ENERGY SOLUTION, LTD., Seoul (KR)

(72) Inventors: Su Yeon Lee, Daejeon (KR); Ye Ri Kim, Daejeon (KR); Oh Byong Chae, Daejeon (KR); Seo Young Jeon, Daejeon (KR); Seung Hae Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 660 days.

(21) Appl. No.: 17/796,313

(22) PCT Filed: Feb. 24, 2021

(86) PCT No.: PCT/KR2021/002294
§ 371 (c)(1),
(2) Date: Jul. 29, 2022

(87) PCT Pub. No.: WO2021/172857
PCT Pub. Date: Sep. 2, 2021

(65) Prior Publication Data
US 2023/0080890 A1 Mar. 16, 2023

(30) Foreign Application Priority Data

Feb. 28, 2020 (KR) ........................ 10-2020-0025082

(51) Int. Cl.
*H01M 4/04* (2006.01)
*H01M 4/02* (2006.01)
(Continued)

(52) U.S. Cl.
CPC ....... *H01M 4/0445* (2013.01); *H01M 4/0404* (2013.01); *H01M 4/0459* (2013.01);
(Continued)

(58) Field of Classification Search
CPC ............. H01M 4/0445; H01M 4/0404; H01M 4/0459; H01M 4/386; H01M 4/583; H01M 10/052; H01M 10/446; H01M 2004/027
See application file for complete search history.

(56) References Cited

U.S. PATENT DOCUMENTS 9,748,599 B2 8/2017 Grant et al.
2009/0274951 A1* 11/2009 Kinoshita ......... H01M 10/0587
429/94
(Continued)

FOREIGN PATENT DOCUMENTS

CN 108281723 A * 7/2018 .......... H01M 10/446
CN 109119593 A 1/2019
(Continued)

OTHER PUBLICATIONS https://www.hioki.com/us-en/industries-solutions/manufacturing/liion-ocv-test.html (Webpage) (Year: 2025).*
(Continued)

*Primary Examiner* — Brian R Ohara
*Assistant Examiner* — Emily Elizabeth Freeman
(74) *Attorney, Agent, or Firm* — Birch, Stewart, Kolasch & Birch, LLP

(57) ABSTRACT

Disclosed is a method of manufacturing a secondary battery, the method including: manufacturing a pre-lithiation cell including a negative electrode and a lithium metal counter electrode and pre-lithiating the negative electrode by charging the pre-lithiation cell; separating the pre-lithiated negative electrode from the pre-lithiation cell and manufacturing an electrode assembly including the pre-lithiated negative electrode and a positive electrode; impregnating the electrode assembly with an electrolyte; activating the impregnated electrode assembly by performing a first charging the impregnated electrode assembly; removing gas generated in (Continued)

the activation; discharging the activated electrode assembly immediately after removing the gas; and performing a second charging on the discharged electrode assembly.

13 Claims, 2 Drawing Sheets

(51) Int. Cl.

| | |
|---|---|
| *H01M 4/38* | (2006.01) |
| *H01M 4/583* | (2010.01) |
| *H01M 10/052* | (2010.01) |
| *H01M 10/44* | (2006.01) |

(52) U.S. Cl.
CPC ........... *H01M 4/386* (2013.01); *H01M 4/583* (2013.01); *H01M 10/052* (2013.01); *H01M 10/446* (2013.01); *H01M 2004/027* (2013.01)

(56) References Cited

U.S. PATENT DOCUMENTS

| | | | |
|---|---|---|---|
| 2010/0313410 A1* | 12/2010 | Min | H01M 10/058 |
| | | | 29/623.2 |
| 2014/0310951 A1 | 10/2014 | Grant et al. | |
| 2015/0118524 A1 | 4/2015 | Lee et al. | |
| 2017/0125854 A1 | 5/2017 | Phan et al. | |
| 2017/0331144 A1 | 11/2017 | Oguni et al. | |
| 2018/0040914 A1 | 2/2018 | Grant et al. | |
| 2018/0205090 A1* | 7/2018 | Lee | H01M 4/662 |
| 2019/0044130 A1* | 2/2019 | Ogata | H01M 4/366 |
| 2019/0341619 A1* | 11/2019 | Saka | H01M 4/62 |
| 2020/0058954 A1 | 2/2020 | Oguni et al. | |
| 2020/0161625 A1 | 5/2020 | Vega et al. | |
| 2023/0006186 A1* | 1/2023 | Lou | H01M 4/1393 |

FOREIGN PATENT DOCUMENTS

| | | | |
|---|---|---|---|
| CN | 109671999 | A | 4/2019 |
| CN | 110518189 | A | 11/2019 |
| JP | 2010-97707 | A | 4/2010 |
| JP | 6102556 | B2 | 3/2017 |
| JP | 2017-191864 | A | 10/2017 |
| JP | 6457272 | B2 | 1/2019 |
| JP | 3605496 | B2 | 11/2019 |
| KR | 10-0291067 | B1 | 6/2001 |
| KR | 10-2015-0014877 | A | 2/2015 |
| KR | 10-2015-0049894 | A | 5/2015 |
| KR | 10-2015-0110797 | A | 10/2015 |
| KR | 10-1602015 | B1 | 3/2016 |
| KR | 10-2017-0128102 | A | 11/2017 |
| KR | 10-2018-0000605 | A | 1/2018 |
| KR | 10-1845958 | B1 | 4/2018 |
| WO | WO 2019/014094 | A1 | 1/2019 |
| WO | WO 2019/070896 | A1 | 4/2019 |

OTHER PUBLICATIONS

Extended European Search Report for European Application No. 21761215.9, dated May 25, 2023.
International Search Report (PCT/ISA/210) issued in PCT/KR2021/002294 mailed on Jun. 11, 2021.

\* cited by examiner

[FIG. 1]
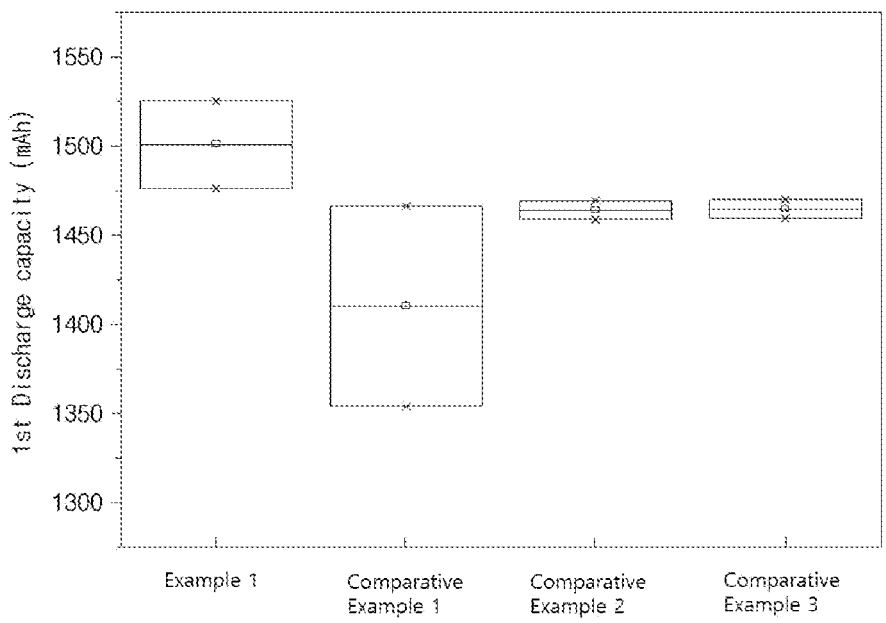
[FIG. 2]
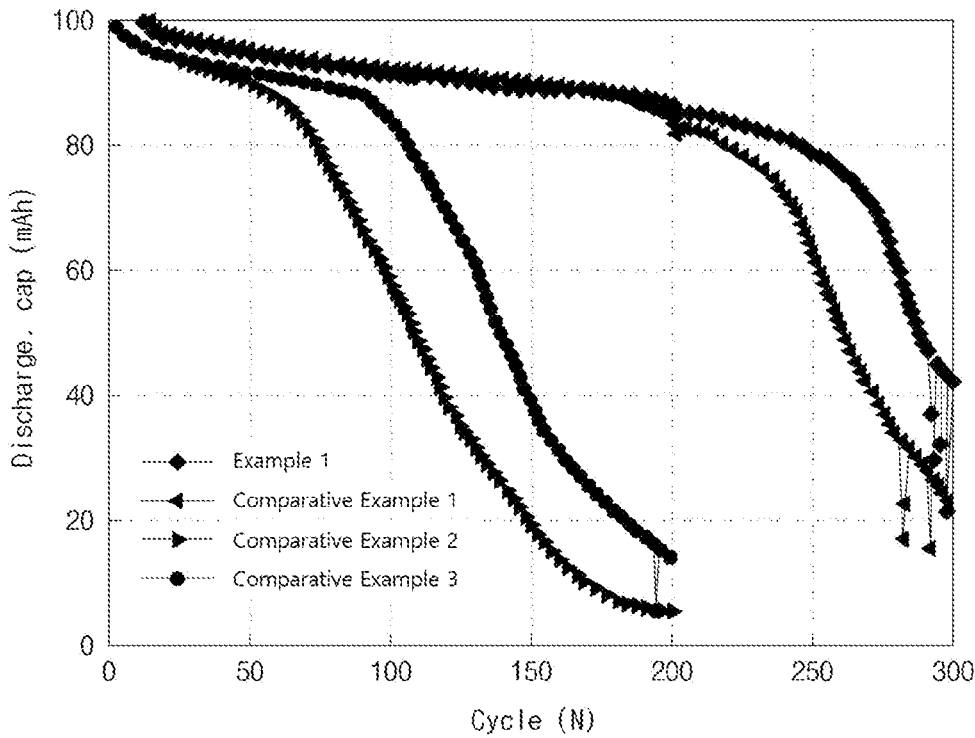

[FIG. 3]
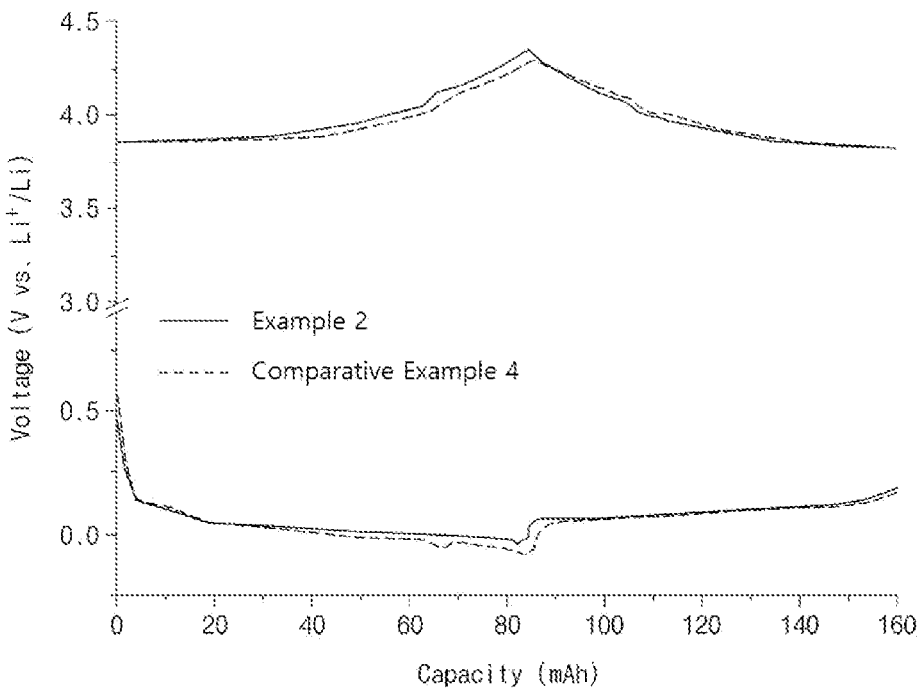

METHOD OF MANUFACTURING SECONDARY BATTERY

TECHNICAL FIELD

Cross-Reference to Related Application

This application claims priority to and the benefit of Korean Patent Application No. 10-2020-0025082, filed on Feb. 28, 2020, the disclosure of which is incorporated herein by reference in its entirety.

Technical Field

The present invention relates to a method of manufacturing a secondary battery.

BACKGROUND ART

Recently, with the rapid spread of electronic apparatuses using batteries, such as mobile phones, notebook computers, electrical vehicles, etc., demand for secondary batteries that are small, light-weight, and relatively high-capacity has been rapidly increasing. Particularly, lithium secondary batteries are light-weight and have high energy density, and thus have attracted attention as driving power sources of portable devices. Accordingly, research and development efforts for improving the performance of lithium secondary batteries are actively performed.

In general, lithium secondary batteries include a positive electrode, a negative electrode, and a separator between the positive electrode and the negative electrode, an electrolyte, an organic solvent, and the like. Also, the positive electrode and the negative electrode may include an active material layer including a positive electrode active material or a negative electrode active material formed on a current collector. In general, lithium-containing metal oxides, such as $LiCoO_2$ and $LiMn_2O_4$, are used as positive electrode active materials in the positive electrode, and lithium-free carbon-based active materials, silicon-based active materials, and the like are used as negative electrode active materials in the negative electrode.

A secondary battery is manufactured through a process of manufacturing an electrode assembly and a process of activating the electrode assembly. The activation is generally performed by impregnating the assembled electrode assembly with an electrolyte, followed by a process of partial charging the electrode assembly, degassing, and a process of fully charging the electrode assembly.

Lithium is intercalated into the negative electrode through the activation, and the electrolyte and a lithium salt react on a surface of the negative electrode to produce compounds such as $Li_2CO_3$, $Li_2O$, and $LiOH$. These compounds form a kind of passivation layer on the surface of the negative electrode, and the passivation layer is referred to as a solid electrolyte interface layer (hereinafter, referred to as a SEI layer). After the SEI layer is formed, the SEI layer acts as an ion tunnel to allow passage of lithium ions, the lithium ions are prevented from a side reaction with the negative electrode or other materials, and an amount of charge consumed in the SEI layer is an irreversible capacity and has characteristics of not reversibly reacting during discharge. Therefore, decomposition of the electrolyte no longer occurs through the formation of the SEI layer and an amount of lithium ions in the electrolyte is reversibly maintained, so that stable charging and discharging may be maintained.

Meanwhile, the formation reaction of the solid electrolyte interface layer formed during initial charging of the negative electrode is an irreversible reaction and causes consumption of lithium ions, and thus there is a problem of reducing the capacity of the battery, and as a cycle of the battery is repeated, lithium ions are consumed, resulting in a decrease in the capacity and a decrease in cycle lifespan.

Therefore, methods of preventing a decrease in capacity and improving cycle lifespan in which, before performing activation, pre-lithiation is performed by a method of intercalating lithium into a negative electrode in advance and the like to form a passivation layer on a surface of the negative electrode in advance, are being developed.

As a method of the pre-lithiation, a physicochemical method of incorporating lithium in a negative electrode by direct contact between the negative electrode and a lithium metal, an electrochemical method of incorporating lithium in a negative electrode by charging the negative electrode by an electrochemical charger/discharger by using a lithium metal as a counter electrode, and the like are known.

However, in the case of the above pre-lithiation methods, formation of negative electrode overvoltage due to non-uniform intercalation of lithium into the negative electrode and the like, a decrease in initial capacity, and the like are problems, and thus, there is a concern that it may be difficult to achieve the purpose of pre-lithiation.

Korean Patent Registration No. 10-0291067 discloses a method of pre-lithiating a carbon electrode and a method of manufacturing a lithium secondary battery using the same, but there is a limit to solving the above-described problems.

RELATED ART DOCUMENT

Patent Document

Korean Patent Registration No. 10-0291067

DETAILED DESCRIPTION OF THE INVENTION

Technical Problem

The present invention is directed to providing a method of manufacturing a secondary battery with high initial capacity and improved lifespan characteristics.

Technical Solution

The present invention is directed to providing a method of manufacturing a secondary battery, the method including: manufacturing a pre-lithiation cell including a negative electrode and a lithium metal counter electrode and pre-lithiating the negative electrode by charging the pre-lithiation cell; separating the pre-lithiated negative electrode from the pre-lithiation cell and manufacturing an electrode assembly including the pre-lithiated negative electrode and a positive electrode; impregnating the electrode assembly with an electrolyte; activating the impregnated electrode assembly by performing a first charging the impregnated electrode assembly; removing gas generated in the activation; discharging the activated electrode assembly immediately after removing the gas; and performing a second charging on the discharged electrode assembly.

Advantageous Effects

According to a method of manufacturing a secondary battery of the present invention, in a process of activation of an electrode assembly including a pre-lithiated negative electrode, a process of discharging the activated electrode assembly immediately after a degassing process is performed. According to the discharging process, the formation of negative electrode overvoltage due to non-uniform intercalation of lithium in first charging is resolved, initial capacity, energy density, and lifespan performance are simultaneously improved, and effects of pre-lithiation can be maximized.

DESCRIPTION OF DRAWINGS

FIG. 1 is a graph illustrating the initial discharge capacity of secondary batteries manufactured from Example 1 and Comparative Examples 1 to 3.

FIG. 2 is a graph illustrating the cycle capacity retention rate of secondary batteries manufactured from Example 1 and Comparative Examples 1 to 3.

FIG. 3 is a graph illustrating a three-electrode voltage profile of secondary batteries manufactured from Example 2 and Comparative Example 4.

MODES OF THE INVENTION

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

The terms used in the present specification are only for describing exemplary embodiments and are not intended to restrict the present invention. Singular expressions include plural expressions unless the context clearly indicates otherwise.

In the present specification, terms such as "comprise", "include" or "have" are intended to designate the presence of stated features, numbers, steps, elements, or a combination thereof, and it should be understood that the possibility of the presence or addition of one or more other features or numbers, steps, elements, or combinations thereof is not precluded.

In the present specification, an average particle diameter $(D_{50})$ may be defined as a particle diameter corresponding to a cumulative volume of 50% in a particle diameter distribution curve. The average particle diameter $(D_{50})$ may be measured using, for example, a laser diffraction method. The laser diffraction method is generally capable of measuring particle diameters from a submicron region to several millimeters (mm), and results with high reproducibility and high resolution may be obtained.

Hereinafter, the present invention will be described in detail.

Method of Manufacturing Secondary Battery

The present invention relates to a method of manufacturing a secondary battery, and particularly, to a method of manufacturing a lithium secondary battery.

Specifically, a method of manufacturing a secondary battery of the present invention includes: manufacturing a pre-lithiation cell including a negative electrode and a lithium metal counter electrode and pre-lithiating the negative electrode by charging the pre-lithiation cell; separating the pre-lithiated negative electrode from the pre-lithiation cell and manufacturing an electrode assembly including the pre-lithiated negative electrode and a positive electrode; impregnating the electrode assembly with an electrolyte; activating the impregnated electrode assembly by performing first charging the impregnated electrode assembly; removing gas generated in the activation; discharging the activated electrode assembly immediately after removing the gas; and performing a second charging on the discharged electrode assembly.

In the case of a conventional pre-lithiation process, there is a concern that lithium may be non-uniformly intercalated into a negative electrode in a process of charging the negative electrode, which may lead to the formation of negative electrode overvoltage, initial capacity reduction, and lifespan performance degradation. In order to solve these problems, a method of manufacturing a secondary battery of the present invention is characterized by, in a process of activation of an electrode assembly including a pre-lithiated negative electrode, performing a process of discharging the activated electrode assembly immediately after a degassing process. Lithium that is non-uniformly intercalated in the activation process after pre-lithiation may be deintercalated through the discharging process and lithium may be more uniformly intercalated into the negative electrode during the subsequent recharging process, whereby the problem of the formation of negative electrode overvoltage may be resolved, and a stable and robust solid electrolyte interface layer (hereinafter, referred to as a SEI layer) may be formed so that a secondary battery with improved initial capacity, high energy density, and an excellent cycle capacity retention rate may be realized.

Pre-Lithiation

A method of manufacturing a secondary battery of the present invention includes manufacturing a pre-lithiation cell including a negative electrode and a lithium metal counter electrode and pre-lithiating the negative electrode by charging the pre-lithiation cell.

The negative electrode includes a negative electrode current collector and a negative electrode active material layer formed on the negative electrode current collector, and the negative electrode active material layer may include a negative electrode active material.

The negative electrode current collector is not particularly limited as long as it has high conductivity without causing chemical changes in the battery. Specifically, the negative electrode current collector may include at least one selected from the group consisting of copper, stainless steel, aluminum, nickel, titanium, baked carbon, and an aluminum-cadmium alloy, preferably, copper.

The negative electrode current collector may generally have a thickness of 3 $\mu m$ to 500 $\mu m$.

The negative electrode current collector may have fine irregularities formed on the surface thereof to increase the adhesion of a negative electrode active material. For example, the negative electrode current collector may be used in various forms such as a film, a sheet, a foil, a net, a porous material, a foam, and a nonwoven fabric.

The negative electrode active material may include at least one selected from a carbon-based active material and a silicon-based active material.

The silicon-based active material may include a compound represented by $SiO_x$ ($0 \leq x < 2$). Because $SiO_2$ does not react with lithium ions and thus may not store lithium, it is preferable that x is within the above-described range, and more preferably, the silicon-based active material may include SiO.

An average particle diameter ($D_{50}$) of the silicon-based active material may be 1 $\mu m$ to 30 $\mu m$, preferably, 3 $\mu m$ to 15 $\mu m$, in terms of structural stability of the negative electrode active material during charging/discharging.

The carbon-based active material may include at least one selected from the group consisting of artificial graphite, natural graphite, hard carbon, soft carbon, carbon black, acetylene black, Ketjen black, super P, graphene, and fibrous carbon, and preferably, may include at least one selected from the group consisting of artificial graphite and natural graphite.

An average particle diameter ($D_{50}$) of the carbon-based active material may be 5 $\mu m$ to 35 $\mu m$, preferably, 8 $\mu m$ to 25 $\mu m$, in terms of structural stability of the negative electrode active material during charging/discharging.

The negative electrode active material may include the carbon-based active material and the silicon-based active material, and specifically, may include the carbon-based active material and the silicon-based active material in a weight ratio of 50:50 to 99:1, preferably, 70:30 to 95:5.

An amount of the negative electrode active material included in the negative electrode active material layer may be 80% by weight to 99% by weight, preferably, 90% by weight to 98% by weight.

The negative electrode active material layer may further include a binder and/or a conductive material, in addition to the negative electrode active material.

The binder is used to improve the performance of the battery by improving the adhesion between the negative electrode active material layer and the negative electrode current collector. The binder may include, for example, at least any one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropyl cellulose, regenerated cellulose, polyvinylpyrrolidone, polytetrafluoroethylene, polyethylene, propylene polymer, polyacrylic acid, an ethylene-propylene-diene monomer (EPDM), a sulfonated EPDM, styrene butadiene rubber (SBR), fluoro rubber, and a material having hydrogen thereof substituted with Li, Na, or Ca, and may include various copolymers thereof.

An amount of the binder included in the negative electrode active material layer may be 0.5% by weight to 20% by weight, preferably, 2% by weight to 10% by weight.

The conductive material is not particularly limited as long as it has conductivity without causing chemical changes in the battery, and may include, for example, graphite such as natural graphite or artificial graphite; carbon black types such as carbon black, acetylene black, Ketjen black, channel black, furnace black, lamp black, or thermal black; conductive fibers such as carbon fibers or metal fibers; conductive tubes such as carbon nanotubes; fluorocarbons; metal powders such as aluminum or nickel powders; conductive whiskers such as zinc oxide or potassium titanate; conductive metals oxide such as titanium oxide; and polyphenylene derivatives.

An amount of the conductive material included in the negative electrode active material layer may be 0.5% by weight to 5% by weight, preferably, 1 part by weight to 3% by weight.

A thickness of the negative electrode active material layer may be 10 $\mu m$ to 100 $\mu m$, preferably, 50 $\mu m$ to 80 $\mu m$.

The negative electrode may be manufactured by applying, on the negative electrode current collector, a negative electrode slurry including the negative electrode active material and optionally the binder, the conductive material, and a solvent for forming the negative electrode slurry, followed by drying and roll pressing.

The solvent for forming the negative electrode slurry may include at least one selected from the group consisting of distilled water, ethanol, methanol, and isopropyl alcohol, preferably, distilled water, in terms of facilitating dispersion of, for example, the negative electrode active material, the binder, and/or the conductive material.

The lithium metal counter electrode may function as a counter electrode for the negative electrode during electrochemical charging for pre-lithiation of the negative electrode.

The lithium metal counter electrode may function as a lithium source for transferring lithium ions to the negative electrode during pre-lithiation by electrochemical charging. The lithium metal counter electrode may be in the form of a sheet disposed to face the negative electrode.

A thickness of the lithium metal counter electrode may be appropriately set in consideration of a degree of pre-lithiation of the negative electrode, and specifically, may be 10 $\mu m$ to 500 $\mu m$, preferably, 40 $\mu m$ to 200 $\mu m$.

In the pre-lithiation cell, the negative electrode and the lithium metal counter electrode may be spaced apart from each other, and in this case, an electrode short phenomenon, which may occur due to direct contact between the negative electrode and the lithium metal counter electrode during electrochemical charging of the negative electrode, may be prevented.

In the pre-lithiation cell, when the negative electrode and the lithium metal counter electrode are spaced apart from each other, the negative electrode and the lithium metal counter electrode may be spaced apart from each other at intervals of 1 mm to 20 mm, preferably, 3 mm to 15 mm, and when the above-described range is satisfied, it is preferable in that lithium may be smoothly intercalated into the negative electrode during the pre-lithiation while an electrode short phenomenon, which may occur due to direct contact between the negative electrode and the lithium metal counter electrode, is sufficiently prevented.

The pre-lithiation cell may further include a separator between the negative electrode and the lithium metal counter electrode. The separator prevents an electrode short phenomenon, which may occur due to direct contact between the negative electrode and the lithium metal counter electrode during electrochemical charging of the negative electrode, and may prevent a problem of not being able to control a rate of lithium intercalation into the negative electrode during direct contact between the negative electrode and the lithium metal counter electrode.

It is preferable that the separator have a low resistance with respect to lithium ion movement and excellent electrolyte impregnation capability, and specifically, the separator may include a porous polymer film including at least one selected from the group consisting of an ethylene polymer, a propylene polymer, an ethylene/butene copolymer, an ethylene/hexene copolymer, an ethylene/methacrylate copolymer, and a polyolefin-based polymer; a porous nonwoven fabric including at least one selected from the group consisting of a glass fiber with a high melting point and a polyethylene terephthalate fiber; or a combination of two or more thereof. The separator may preferably include the porous polymer film, more preferably, the porous polymer film including the polyolefin-based polymer, in terms of mechanical stability and chemical stability.

A thickness of the separator may be 3 $\mu m$ to 50 $\mu m$, preferably, 8 $\mu m$ to 20 $\mu m$, in terms of smooth intercalation/diffusion of lithium into the negative electrode and uniform pre-lithiation.

The pre-lithiation may be performed by charging the pre-lithiation cell.

The pre-lithiation may be performed at a current density of 0.2 mA/cm$^2$ to 10 mA/cm$^2$, preferably, 2 mA/cm$^2$ to 10 mA/cm$^2$, and when electrochemically charged at a current density within the above-described range, stable and uniform pre-lithiation may be performed on the negative electrode active material.

The pre-lithiation may be performed by charging the pre-lithiation cell so that a state of charge (SOC) of the pre-lithiation cell becomes 5% to 30%, preferably, 7% to 25%. When pre-lithiation is performed on the pre-lithiation cell by electrochemically charging the pre-lithiation cell to within the above-described range, the SEI layer may be uniformly and stably formed on the negative electrode so that reversible capacity of the battery may be improved and cycle characteristics of the battery may be improved.

The pre-lithiation may be performed by impregnating the pre-lithiation cell with a pre-lithiation solution and electrochemically charging the impregnated pre-lithiation cell.

The pre-lithiation solution may include a lithium salt and an organic solvent.

The organic solvent is not particularly limited as long as it may serve as a medium for performing an electrochemical reaction and ion migration, and specifically, an ester-based solvent such as methyl acetate, ethyl acetate, $\gamma$-butyrolactone, or $\varepsilon$-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; nitriles such as R-CN (R is a C2-C20 hydrocarbon group with a linear, branched or cyclic structure and may include a double-bonded aromatic ring or an ether linkage); amides such as dimethyl formamide; dioxolanes such as 1,3-dioxolane; or sulfolanes may be used as the organic solvent. Among them, the carbonate-based solvent is preferable in terms of improving electrochemical stability, and specifically, EMC, EC, or the like is more preferable.

The lithium salt may include at least one selected from the group consisting of LiPF$_6$, LiClO$_4$, LiAsF$_6$, LiBF$_4$, LiSbF$_6$, LiAlO$_4$, LiAlCl$_4$, LiCF$_3$SO$_3$, LiC$_4$F$_9$SO$_3$, LiN(C$_2$F$_5$SO$_3$)$_2$, LiN(C$_2$F$_5$SO$_2$)$_2$, LiN(CF$_3$SO$_2$)$_2$, LiCl, LiI, and LiB(C$_2$O$_4$)$_2$, and preferably, may include LiPF$_6$.

A concentration of the lithium salt may be 0.1M to 3M, preferably, 0.5M to 1.5M based on the pre-lithiation solution, and when the above-described range is satisfied, it is preferable in that lithium salts may be sufficiently dissolved so that lithium ions may be smoothly intercalated into an active material.

The pre-lithiation solution may further include at least one selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI), preferably, an additive including FEC, in terms of stabilizing a surface of a negative electrode active material during pre-lithiation to allow pre-lithiation to be smoothly performed.

An amount of the additive included in the pre-lithiation solution may be 0.1% by weight to 15% by weight, preferably, 0.5% by weight to 5% by weight, with respect to the total weight of the pre-lithiation solution, stabilizing a surface of a negative electrode active material to allow pre-lithiation to be smoothly performed.

Impregnation of the pre-lithiation cell may be performed for 0.5 hours to 35 hours, preferably, 8 hours to 30 hours, in terms of stable pre-lithiation.

<Manufacture of Electrode Assembly>

The method of manufacturing a secondary battery of the present invention includes separating the pre-lithiated negative electrode from the pre-lithiation cell and manufacturing an electrode assembly including the pre-lithiated negative electrode and a positive electrode.

The pre-lithiated negative electrode separated from the pre-lithiation cell may be provided as a negative electrode of an electrode assembly. When the pre-lithiated negative electrode is separated from the pre-lithiation cell, a process of cleaning the pre-lithiated negative electrode may be performed. A solvent such as dimethyl carbonate (MC) may be used for the cleaning.

The positive electrode may be disposed to face the negative electrode.

The positive electrode may include a positive electrode current collector and a positive electrode active material layer formed on the positive electrode current collector.

The positive electrode current collector is not particularly limited as long as it has high conductivity without causing chemical changes in the battery. Specifically, the positive electrode current collector may include copper, stainless steel, aluminum, nickel, titanium, baked carbon, copper or stainless steel which is surface-treated with carbon, nickel, a titanium, silver, or the like, an aluminum-cadmium alloy, and the like.

The positive electrode current collector may generally have a thickness of 3 $\mu m$ to 500 $\mu m$.

The positive electrode current collector may have fine irregularities formed on the surface thereof to increase the adhesion of a positive electrode active material. For example, the positive electrode current collector may be used in various forms such as a film, a sheet, a foil, a net, a porous material, a foam, and a nonwoven fabric.

The positive electrode active material layer may include a positive electrode active material.

The positive electrode active material is a compound capable of reversible intercalation and deintercalation, and specifically, may include a lithium transition metal composite oxide including lithium and at least one transition metal consisting of nickel, cobalt, manganese, and aluminum. More specifically, the lithium transition metal composite oxide may include lithium and a transition metal including nickel, cobalt, and manganese.

Specifically, the lithium transition metal composite oxide may be a lithium-manganese-based oxide (e.g., LiMnO$_2$, LiMn$_2$O$_4$, etc.), a lithium-cobalt-based oxide (e.g., LiCoO$_2$, etc.), a lithium-nickel-based oxide (e.g., LiNiO$_2$, etc.), a lithium-nickel-manganese-based oxide (e.g., LiNi$_{1-Y}$Mn$_Y$O$_2$ (wherein, 0<Y<1), LiMn$_{2-Z}$Ni$_Z$O$_4$ (wherein, 0<Z<2), etc.), a lithium-nickel-cobalt-based oxide (e.g., LiNi$_{1-Y1}$Co$_{Y1}$O$_2$ (wherein, 0<Y1<1), etc.), a lithium-manganese-cobalt-based oxide (e.g., LiCo$_{1-Y2}$Mn$_{Y2}$O$_2$ (wherein, 0<Y2<1), $LiMn_{2-z1}Co_{z1}O_4$ (wherein, $0<Z1<2$), etc.), a lithium-nickel-manganese-cobalt-based oxide (e.g., $Li(Ni_pCo_qMn_{r1})O_2$ (wherein, $0<p<1$, $0<q<1$, $0<r1<1$, $p+q+r1=1$), or $Li(Ni_{p1}Co_{q1}Mn_{r2})O_4$ (wherein, $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{S2})O_2$ (wherein, M is selected from the group consisting of Al, Fe, V, Cr, Ti, Ta, Mg, and Mo, p2, q2, r3, and s2 are atomic fractions of independent elements, respectively, and $0<p2<1$, $0<q2<1$, $0<r3<1$, $0<s2<1$, $p2+q2+r3+s2=1$ is satisfied), etc.), and may include any one or two or more compounds thereof. Among them, given that capacity characteristics and stability of the battery may be increased, the lithium transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, etc.), or a lithium nickel cobalt aluminum oxide (e.g., $Li(Ni_{0.8}Mn_{0.15}Al_{0.05})O_2$, etc.), etc., and considering a remarkable improvement effect by controlling the type and content ratio of the constituent elements forming the lithium transition metal composite oxide, the lithium transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, etc., and any one or two or more compounds thereof may be used.

An amount of the positive electrode active material included in the positive electrode active material layer may be 80% by weight to 90% by weight, preferably, 92% by weight to 98.5% by weight, in consideration of sufficient exhibition of the capacity of the positive electrode active material.

The positive electrode active material layer may further include a binder and/or a conductive material, in addition to the above-described positive electrode active material.

The binder is a component that aids in binding of an active material and a conductive material and bonding to a current collector, and specifically, may include at least one selected from the group consisting of polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, and fluoro rubber, preferably, polyvinylidene fluoride.

An amount of the binder included in the positive electrode active material may be 1 part by weight to 20% by weight, preferably, 1.2% by weight to 10% by weight, wherein the binder sufficiently secures binding force between components such as positive electrode active materials.

The conductive material may be used to assist and improve the conductivity of the secondary battery, and is not particularly limited as long as it has conductivity without causing a chemical change. Specifically, the conductive material may include at least one selected from the group consisting of graphite such as natural graphite or artificial graphite; carbon black types such as carbon black, acetylene black, Ketjen black, channel black, furnace black, lamp black, or thermal black; conductive fibers such as carbon fibers or metal fibers; conductive tubes such as carbon nanotubes; fluorocarbons; metal powders such as aluminum or nickel powders; conductive whiskers such as zinc oxide or potassium titanate; conductive metal oxides such as titanium oxide; and polyphenylene derivatives, preferably, carbon black, in terms of conductivity improvement.

A specific surface area of the conductive material may be 80 $m^2/g$ to 200 $m^2/g$, preferably, 100 $m^2/g$ to 150 $m^2/g$, in terms of facilitating dispersion of the conductive material when a slurry for forming a positive electrode active material layer is prepared, and further improvement of electrical conductivity.

An amount of the conductive material included in the positive electrode active material layer may be 1 part by weight to 20% by weight, preferably, 1.2% by weight to 10% by weight, in terms of sufficiently securing electrical conductivity.

Considering the balance of capacity between the negative electrode and the positive electrode, in order to minimize effects of volume expansion/contraction of a silicon-based active material in the negative electrode, a thickness of the positive electrode active material layer may be 30 $\mu m$ to 400 $\mu m$, preferably, 50 $\mu m$ to 110 $\mu m$.

The positive electrode may be manufactured by applying, on the positive electrode current collector, a positive electrode slurry including the positive electrode active material and optionally the binder, the conductive material, and a solvent for forming the positive electrode slurry, followed by drying and roll pressing. The solvent for forming the positive electrode slurry may be an organic solvent such as N-methyl-2-pyrrolidone (NMP).

The electrode assembly may further include a separator between the pre-lithiated negative electrode and the positive electrode.

The separator separates the negative electrode and the positive electrode and provides movement path for lithium ions, any separator is available without particular limitation as long as it is used as a separator in general lithium secondary batteries, and especially, a separator that has low resistance with respect to movement of ions of the electrolyte and excellent electrolyte impregnation capability is preferable. Specifically, a porous polymer film, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof may be used. Also, conventional porous nonwoven fabrics, for example, nonwoven fabrics made of glass fibers with a high melting point or polyethylene terephthalate fibers, may be used. Also, a coated separator including a ceramic component or a polymer material may be used to secure thermal endurance or mechanical strength, and optionally, a single layer or multilayer structure may be used.

<Impregnation with Electrolyte>

The method of manufacturing a secondary battery of the present invention includes impregnating the electrode assembly with an electrolyte. The electrode assembly is impregnated with the electrolyte, and thus the electrode assembly may be activated by first charging, which will be described below, or the like.

The electrolyte may include an organic solvent and a lithium salt.

The organic solvent may be used without particular limitation as long as it may serve as a medium through which ions involved in electrochemical reaction of a battery may move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), ethyl methyl carbonate (EMC), ethylene carbonate (EC), propylene carbonate (PC), or fluoroethylene carbonate (FEC); an alcohol-based solvent such as ethylalcohol or isopropyl alcohol; nitriles such as R-CN (wherein, R is a C2-C20 hydrocarbon group with a linear, branched or cyclic structure and may include a double-bonded aromatic ring or an ether linkage); amides such as dimethyl formamide; dioxolanes such as 1,3-dioxolane; or sulfolanes may be used. Among them, the carbonate-based solvent is preferable, and a mixture of a cyclic carbonate (e.g., EC, PC, or FEC) with high ion conductivity and high permittivity, which is capable of increasing charging and discharging performance of a battery, and a linear carbonate-based compound (e.g., EMC, DMC, or DEC) with low viscosity is more preferable. In this case, when a cyclic carbonate and a chain carbonate are mixed in a volume ratio of about 1:9 to about 5:5, the electrolyte may exhibit excellent performance. More preferably, mixing FEC as a cyclic carbonate with DEC as a linear carbonate is preferable in terms of improvement in performance of electrolyte.

Any compound capable of providing lithium ions used in a lithium secondary battery may be used as the lithium salt without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used. A concentration of the lithium salt is preferably used within 0.1 M to 2.0 M. When the concentration of the lithium salt is within the range, the electrolyte has appropriate conductivity and viscosity, and thus, may exhibit excellent electrolyte performance, and lithium ions may effectively move.

The electrolyte may further include an additive. Specifically, the additive may further include at least one selected from the group consisting of vinylene carbonate (VC), polystyrene (PS), succinonitrile, ethylene glycol bis(propionitrile) ether, and lithium bis(fluorosulfonyl)imide, preferably, an additive including VC, in terms of easily and stably forming an SEI layer formed through ring opening polymerization.

An amount of the additive included in the electrolyte may be 0.1% by weight to 15% by weight, preferably, 0.5% by weight to 5% by weight.

The impregnation may be performed for a time ranging from 12 hours to 100 hours, more preferably, 24 hours to 75 hours, in terms of allowing the electrode assembly to become sufficiently wet with the electrolyte and allowing activation according to charging and discharging to be performed more smoothly.

Impregnating the electrode assembly with the electrolyte may be performed at 15° C. to 30° C., more specifically, 20° C. to 27° C., and when the above-described range is satisfied, impregnation property of the electrode assembly may be improved, and preferably, the formation of a dendrite in a negative electrode due to an excessively high temperature and the risk of low voltage generation may be prevented.

<Activation by First Charging>

The method of manufacturing a secondary battery of the present invention includes activating the impregnated electrode assembly by performing a first charging the impregnated electrode assembly.

The first charging may be performed by electrochemically charging the impregnated electrode assembly. The electrochemical charging may be performed using, for example, an electrochemical charger/discharger.

The first charging may be performed while pressing the impregnated electrode assembly, which is preferable in terms of a stable charging process. Specifically, the first charging may be performed while fastening the impregnated electrode assembly between two pressing jigs or pressing plates, and pressing the impregnated electrode assembly.

Specifically, the first charging may be performed while pressing the impregnated electrode assembly at 2 kgf/cm² to 10 kgf/cm², preferably, 0.5 kgf/cm² to 5 kgf/cm². When pressurization is performed within the above-described pressure range, the volume expansion of the negative electrode active material (e.g., a silicon-based active material) and the deformation of the negative electrode, which may occur during the first charging, may be prevented, and thus lithium may be stably and uniformly intercalated into the negative electrode.

The first charging may be performed at 15° C. to 70° C., preferably, at 20° C. to 50° C., and when the above-described range is satisfied, the mobility of lithium during the first charging is improved, so that the lithium is prevented from being locally intercalated into the electrode and uniform charging is possible.

The first charging may be performed by charging the electrode assembly so that a state of charge (SOC) of the electrode assembly is greater than or equal to 40%. Specifically, the first charging may be performed by charging the electrode assembly so that a SOC of the electrode assembly is 60% to 90%, more preferably, 70% to 85%, in terms of preventing excessive volume expansion of the negative electrode active material (e.g., silicon-based active material) and deformation of the negative electrode during charging and the formation of overvoltage of the negative electrode due to excessive charging and preventing a phenomenon in which lithium is reduced and precipitated due to a decrease in the potential of the negative electrode.

<Degassing>

The method of manufacturing a secondary battery of the present invention includes removing gas generated in the activation. Gas may be generated as a by-product due to generation of a SEI layer after activation of the electrode assembly and the generation of irreversible capacity. Therefore, a process of removing the by-product in order to use the activated secondary battery may be performed, and the secondary battery may be manufactured in a usable form through a degassing process.

As the process of removing the gas, a method generally used in the field of secondary batteries may be performed without limitation. For example, the process of removing the gas may be performed by partially opening the electrode assembly to remove gas and then sealing the same.

<Discharging Process>

The method of manufacturing a secondary battery of the present invention includes discharging the activated electrode assembly immediately after removing the gas.

During a charging process for pre-lithiation or activation after the pre-lithiation, lithium may be non-uniformly intercalated into the negative electrode, resulting in overvoltage of the negative electrode or insufficient formation of the SEI layer. In order to solve this, the method of manufacturing a secondary battery of the present invention includes deintercalating lithium that is non-uniformly intercalated during the first charging process after the pre-lithiation process or has a non-uniform potential, by performing a discharging process after the degassing process. As the lithium is intercalated back into the negative electrode by second charging, which will be described below, the lithium is uniformly intercalated into the negative electrode to form a stable and robust SEI layer in the secondary battery manufactured from the manufacturing method of the present invention, and it is possible to solve the overvoltage of the negative electrode, improve initial capacity, improve energy density, and realize an excellent cycle capacity retention rate. When the discharging process is not performed, there is a concern that lithium non-uniformly intercalated into the negative electrode may cause overvoltage of the negative electrode, due to a difficulty in uniformly forming the SEI layer, when the secondary battery is used, an additional SEI layer is continuously formed or non-uniform charging occurs, and there is a problem in which lithium is precipitated. Thus, it is difficult to obtain an effect of improvements in initial capacity and lifespan characteristics.

In the present specification, the expression "immediately after removing the gas" may mean that no additional process such as a charging process is t performed between the degassing process and the discharging process. Specifically, a SOC of the electrode assembly may not increase between the degassing process and the discharging process. For example, when an additional charging is performed immediately after the degassing process, due to lithium being non-uniformly intercalated into the negative electrode, overvoltage of the negative electrode may occur, and non-uniform charging of the secondary battery may occur, such that lithium may be precipitated.

The discharging may be performed by discharging the electrode assembly so that the SOC of the electrode assembly is 30% or less, preferably, 10% or less, more preferably, 0%, and when the above-described range is satisfied, lithium non-uniformly intercalated into the negative electrode may be sufficiently removed.

The method of manufacturing a secondary battery of the present invention may further include standing the discharged electrode assembly. According to the discharging process, the SEI layer formed in the negative electrode may be partially dissolved and partially remain. In this case, the remaining SEI layer may be formed non-uniformly during the first charging due to an effect of the pre-lithiation. However, when a standing process is performed after the discharging process as in the present invention, as the potential of a surface of the negative electrode is stabilized during a mounting period, the SEI layer that is formed unstable may be preferentially dissolved. Therefore, during second charging, lithium is more uniformly intercalated into the negative electrode and a stable SEI layer may be formed, so that an excellent cycle capacity retention rate of a battery may be realized.

The standing may be performed between the discharging process and second charging which will be described below.

The standing may be performed at 45° C. to 80° C., preferably, 55° C. to 65° C., and when the standing is performed at a high temperature within the above-described range, the instability of the SEI layer remaining in the negative electrode may be eliminated.

The standing may be performed for 12 hours to 60 hours, preferably, 18 hours to 48 hours, and when the above-described range is satisfied, a SEI layer may be stably formed.

<Second Charging>

The method of manufacturing a secondary battery of the present invention includes performing a second charging on the discharged electrode assembly.

Through the discharging process, uniform and stable second charging of the negative electrode is possible, and thus lithium may be uniformly intercalated into the negative electrode so that the formation of overvoltage in the negative electrode may be eliminated. Also, although there may be a problem in that the SEI layer is formed in a specific portion or the SEI layer is insufficiently formed due to non-uniform intercalation of lithium into the negative electrode during the pre-lithiation, a new surface of the negative electrode may be formed due to volume expansion of the negative electrode active material during the first charging, and there may be a localized portion that has been degassed in the degassing process, since, after the discharging process, the SEI layer may be evenly formed by the second charging, even in a portion where the SEI layer is not formed, stable and robust formation of the SEI layer is possible. Thus, a secondary battery manufactured from the method of manufacturing a secondary battery of the present invention may realize excellent initial capacity, excellent energy density, and an excellent cycle capacity retention rate according to the elimination of overvoltage in the negative electrode and the formation of the stable SEI layer.

The second charging may be performed by charging the electrode assembly so that a SOC of the electrode assembly is 80% or more, preferably, 90%, more preferably, 100%, which is preferable in terms of being able to fully utilize the capacity within an operating voltage range of the secondary battery.

The second charging may be performed at 20° C. to 60° C., preferably, 23° C. to 27° C.

The method of manufacturing a secondary battery of the present invention may further include performing an additional discharging of the electrode assembly after the second charging. According to the additional discharge, the capacity within an operating voltage range of the secondary battery may be measured.

The secondary battery manufactured by the method of manufacturing a secondary battery of the present invention is useful in portable devices such as mobile phones, laptop computers, and digital cameras and fields of electric vehicles such as hybrid electric vehicles (HEVs) and the like, and especially, may be preferably used as a battery for medium and large-sized battery modules. Therefore, the present invention also provides a medium and large-sized battery module including the above-described secondary battery as a unit battery.

Such the medium and large-sized battery module may be preferably applied to power sources that require high output and large capacity, such as electric vehicles, HEVs, energy storage systems, and the like.

Hereinafter, embodiments of the present invention will be described in detail so that those of ordinary skill in the art can easily implement the present invention. However, the present invention may be implemented in various different forms and is not limited to the embodiments described herein.

EXAMPLES

Example 1: Manufacture of Secondary Battery
<Pre-Lithiation of Negative Electrode>

A mixture in which natural graphite (average particle diameter ($D_{50}$): 10 $\mu m$) and SiO (average particle diameter ($D_{50}$): 5 $\mu m$) as a negative electrode active material, were mixed at a weight ratio of 90:10, carbon black (product name: Super C65, manufacturer: TIMCAL) as a conductive material, and styrene-butadiene rubber (SBR) as a binder were added to a solvent for forming a negative electrode slurry (distilled water) and then mixed to thereby prepare a negative electrode slurry (wherein a solid content is 25% by weight with respect to a total weight of the negative electrode slurry). The negative electrode active material, the conductive material, and the binder were mixed at a weight ratio of 95:2:3.

The negative electrode slurry was applied on both surfaces of a copper current collector (thickness: 10 $\mu m$) as a negative electrode current collector at a loading amount of 300 mg/25 cm$^2$, roll-pressed, and then dried in a vacuum oven at 130° C. for 8 hours to form a negative electrode active material layer (thickness: 70 $\mu m$), thereby manufacturing a negative electrode (thickness of the negative electrode: 150 $\mu m$).

Pre-lithiation was performed on the negative electrode.

Specifically, a lithium metal counter electrode (thickness: 150 $\mu m$) was prepared, and the lithium metal counter electrode and the negative electrode were spaced apart at an interval of 10 mm to form a pre-lithiation cell.

The pre-lithiation cell was immersed in a pre-lithiation solution for 24 hours, and the negative electrode was pre-lithiated by electrochemically charging the pre-lithiation cell through an electrochemical charger/discharger at a current density of 1.2 mA/cm$^2$ by a constant-current (CC) method so that a SOC of the pre-lithiation cell was 15%.

To obtain the pre-lithiation solution, LiPF$_6$ as a lithium salt was added at a concentration of 1 M to an organic solvent in which ethylene carbonate (EC) and ethyl methyl carbonate (EMC) were mixed at a volume ratio of 30:70, and fluoroethylene carbonate (FEC) as an additive was added in an amount of 2% by weight with respect to the total weight of the pre-lithiation solution.

<Manufacture of Electrode Assembly>

The pre-lithiated negative electrode was separated from the pre-lithiation cell and then cleaned using a dimethyl carbonate solvent (DMC).

LiNi$_{0.8}$Co$_{0.1}$Mn$_{0.1}$O$_2$ (average particle diameter (D$_{50}$): 10 $\mu m$) as a positive electrode active material, carbon black (product name: Super C65, manufacturer: TIMCAL) as a conductive material, and polyvinylidene fluoride (PVdF) as a binder were added to a N-methyl pyrrolidone (NMP) solvent at a weight ratio of 97:1:2 and then mixed to thereby prepare a positive electrode slurry. The positive electrode slurry was applied on both surfaces of aluminum current collector (thickness: 15 $\mu m$) as a positive electrode current collector at a loading amount of 600 mg/25 cm$^2$, roll-pressed, and then dried in a vacuum oven at 130° C. for 10 hours to form a positive electrode active material layer (thickness: 70 $\mu m$), thereby manufacturing an positive electrode (thickness of the positive electrode: 155 $\mu m$).

The pre-lithiated negative electrode and the positive electrode were disposed to face each other, a separator (thickness: 17.5 $\mu m$) having a stacked structure of an ethylene polymer (PE)/propylene polymer (PP)/ethylene polymer (PE) was disposed between the negative electrode and the positive electrode to form an electrode assembly, and the electrode assembly was accommodated in a pouch.

<Impregnation with Electrolyte>

The electrode assembly was impregnated at 25° C. for 60 hours.

<Activation by First Charging>

The impregnated electrode assembly was charged at 25° C. through an electrochemical charger/discharger. Specifically, the impregnated electrode assembly was disposed between pressing jigs and then subjected to first charging (using a constant-current (CC) method) at 25° C. and a current of 300 mA through an electrochemical charger/discharger while pressure of 4 kgf/cm$^2$ was applied thereto so that a state of charge (SOC) of the electrode assembly was 80%.

<Degassing Process>

A degassing process was performed on the electrode assembly having undergone the first charging.

<Discharge>

The electrode assembly having undergone the degassing process was discharged at 25° C. through an electrochemical charger/discharger.

The discharging was performed by discharging the electrode assembly so that the SOC of the electrode assembly was 0%.

(Discharging conditions: Perform at a current of 500 mA by using a constant-current (CC) method, Terminate at 2.5 V)

<Second Charging>

The electrode assembly having undergone the discharging was subjected to second charging at 25° C. through an electrochemical charger/discharger. Specifically, the second charging was performed by charging the electrode assembly so that the SOC of the electrode assembly was 100%.

(Charging conditions: Perform at a current of 500 mA by using a constant-current-constant-voltage (CC-CV) method, Terminate at 4.25 V and 150 mA.)

<Additional Discharge>

The electrode assembly having undergone the second charging was additionally discharged through an electrochemical charger/discharger so that the SOC of the electrode assembly was 0%.

(Discharging condition: Performed at a current of 500 mA by using a constant-current (CC) method, Terminate at 2.5 V)

Comparative Example 1: Manufacture of Secondary Battery

A secondary battery was manufactured in the same manner as in Example 1, except that an additional charging process of charging the electrode assembly was performed between the degassing process and the discharging process so that the SOC of the electrode assembly was 100%.

Comparative Example 2: Manufacture of Secondary Battery

A secondary battery was manufactured in the same manner as in Example 1, except that pre-lithiation was not performed on the negative electrode manufactured in Example 1.

Comparative Example 3: Manufacture of Secondary Battery

A secondary battery was manufactured in the same manner as in Comparative Example 1, except that pre-lithiation was not performed on the negative electrode manufactured in Comparative Example 1.

Experimental Example 1: Evaluation of Initial Discharge Capacity

For the secondary batteries manufactured in Example 1 and Comparative Examples 1 to 3, initial discharge capacity was evaluated using an electrochemical charger/discharger.

Specifically, charging and discharging were performed on the secondary batteries under charging (0.5 C CC/CV charge 4.2V 0.05 C cut) and discharging (0.5 C CC discharge 3.0V cut) conditions to measure the initial discharge capacity of Example 1 and Comparative Examples 1 to 3.

FIG. 1 and Table 1 show the initial discharge capacity of Example 1 and Comparative Examples 1 to 3.

TABLE 1

| | Initial discharge capacity (mAh) |
| --- | --- |
| Example 1 | 1501 |
| Comparative Example 1 | 1410 |
| Comparative Example 2 | 1464 |
| Comparative Example 3 | 1465 |

Referring to FIG. 1 and Table 1, it may be confirmed that the secondary battery of Example 1 manufactured according to the method of manufacturing a secondary battery has an excellent level of initial discharge capacity compared to those of Comparative Examples 1 to 3 because pre-lithiation was performed on the negative electrode, the discharging process was performed immediately after the degassing process to resolve a problem of formation of overvoltage in the negative electrode, lithium was allowed to be uniformly intercalated into the negative electrode, and the SEI layer was allowed to be uniformly formed in the negative electrode.

Experimental Example 2: Evaluation of Cycle Capacity Retention Rate

For the secondary batteries manufactured in Example 1 and Comparative Examples 1 to 3, a cycle capacity retention rate was evaluated using an electrochemical charger/discharger.

Charging and discharging were performed on the secondary batteries up to the 300th cycle under charging (0.5 C CC/CV charge 4.2V 0.05 C cut) and discharging (0.5 C CC discharge 3.0V cut) conditions.

A capacity retention rate was evaluated by the following equation. FIG. 2 shows a capacity retention rate graph according to cycle. Also, capacity retention rates of Example 1 and Comparative Examples 1 to 3 at the 200th cycle are shown in Table 2.

Capacity retention rate (%)={(discharge capacity at the Nth cycle)/(discharge capacity at the first cycle)}×100

(In the equation, N is an integer from 1 to 300)

TABLE 2

| | Capacity retention rate (%)@$200^{th}$ cycle |
|---|---|
| Example 1 | 82.5 |
| Comparative Example 1 | 80.6 |
| Comparative Example 2 | 0.05 |
| Comparative Example 3 | 9.0 |

Referring to FIG. 2 and Table 2, it may be confirmed that the secondary battery of Example 1 manufactured according to the method of manufacturing a secondary battery has an excellent level of capacity retention rate compared to those of Comparative Examples 1 to 3 because pre-lithiation was performed on the negative electrode and the discharging process was performed immediately after the degassing process to resolve a problem of formation of overvoltage in the negative electrode, allow lithium to be uniformly intercalated into the negative electrode, and allow the SEI layer to be uniformly formed in the negative electrode.

In the case of Comparative Example 1, it may be confirmed that because the discharging process was not performed immediately after the degassing process, a problem of formation of overvoltage in the negative electrode was not resolved, and lithium was not uniformly intercalated into the negative electrode such that uniform formation of the SEI layer is difficult, deterioration of lifespan characteristics occurs and the deterioration of the lifespan characteristics worsens as the cycle is repeated.

Meanwhile, when comparing capacity retention rate performance of Comparative Example 2 and 3 in which the pre-lithiation process was not performed, it may be confirmed that Comparative Example 2 had deteriorated lifespan performance compared to that of Comparative Example 3 even though the discharging process was performed immediately after the degassing process. This is because the pre-lithiation, which is a process of intercalating lithium into a negative electrode active material in advance, was not performed in Comparative Example 2, such that a degree of volume contraction due to lithium deintercalation from the negative electrode active material, especially, a silicon-based active material, was extremely large during the discharging process, resulting in a phenomenon in which the SEI layer was broken, and thus the capacity appears to be fading rapidly. However, in the case of Example 1, because lithium was intercalated into the negative electrode active material in advance by pre-lithiation, even when the discharging process was performed immediately after the degassing process, a side reaction due to contraction of a volume of a silicon-based active material was small, and the capacity retention rate was able to be improved. Therefore, the secondary battery according to Example 1 may exhibit excellent battery performance by eliminating overvoltage while having an excellent capacity retention rate.

Experimental Example 3: Evaluation on Three-Electrode Voltage Profile

<Manufacture of Secondary Battery>

Example 2: Manufacture of Secondary Battery

A secondary battery of Example 2 was manufactured in the same manner as in Example 1, except that, as the positive electrode active material, $LiCoO_2$ was used instead of $LiNi_{0.8}Co_{0.1}Mn_{0.1}O_2$, the positive electrode active material layer was formed on one surface of the positive electrode rather than on both surfaces thereof, two separators were disposed between the positive electrode and the negative electrode, and a reference electrode was inserted between the two separators.

Comparative Example 4: Manufacture of Secondary Battery

Also, a secondary battery of Comparative Example 4 was manufactured in the same manner as in Comparative Example 1, except that, as the positive electrode active material, $LiCoO_2$ was used instead of $LiNi_{0.8}Co_{0.1}Mn_{0.1}O_2$, the positive electrode active material layer was formed on one surface of the positive electrode rather than on both surfaces thereof, two separators were disposed between the positive electrode and the negative electrode, and a reference electrode was inserted between the two separators.

In Example 2 and Comparative Example 4, the reference electrode includes a main body of a wire structure consisting of copper and an electrode part located at one end of the main body and coated with lithium titanium oxide.

<Evaluation of Three-Electrode Voltage Profile>

The three-electrode voltage profile was evaluated using the secondary batteries of Example 2 and Comparative Example 4. In the evaluation of the three-electrode voltage profile, a reference electrode that does not have a potential change during charging/discharging is used, and the potential behavior of the positive electrode and the negative electrode may be separately confirmed.

The evaluation of the three-electrode voltage profile was performed by charging and discharging the secondary batteries of Example 2 and Comparative Example 4 at 0.33 C, and FIG. 3 shows a three-electrode voltage profile graph.

Referring to FIG. 3, in the secondary battery of Comparative Example 4, as a depth of charge of a negative electrode increases, the potential drop of the negative electrode due to overvoltage is confirmed, and according to the potential drop of the negative electrode, the potential drop of a positive electrode, which makes it difficult to use the positive electrode at a high potential, is confirmed.

However, in the secondary battery of Example 2, there is no potential drop of a negative electrode due to overvoltage, and thus it may be confirmed that non-uniform charging of lithium due to pre-lithiation was alleviated through the discharging process.

The invention claimed is:

1. A method of manufacturing a secondary battery, the method comprising:

manufacturing a pre-lithiation cell comprising a negative electrode and a lithium metal counter electrode, and pre-lithiating the negative electrode by charging the pre-lithiation cell to produce a pre-lithiated negative electrode;

separating the pre-lithiated negative electrode from the pre-lithiation cell and manufacturing an electrode assembly comprising the pre-lithiated negative electrode and a positive electrode;

impregnating the electrode assembly with an electrolyte;

activating the impregnated electrode assembly by performing a first charging on the impregnated electrode assembly;

removing gas generated in the activation;

discharging the activated electrode assembly immediately after removing the gas to produce a discharged electrode, wherein a state of charge of the discharged electrode is 30% or less after the discharging; and performing a second charging on the discharged electrode assembly, wherein no additional process is performed between the removing step and the discharging step, and wherein the pre-lithiation is performed by charging the pre-lithiation cell so that a state of charge of the pre-lithiation cell following the charging is 5% to 30%.

2. A method of manufacturing a secondary battery, the method comprising:

manufacturing a pre-lithiation cell comprising a negative electrode and a lithium metal counter electrode, and pre-lithiating the negative electrode by charging the pre-lithiation cell to produce a pre-lithiated negative electrode;

separating the pre-lithiated negative electrode from the pre-lithiation cell and manufacturing an electrode assembly comprising the pre-lithiated negative electrode and a positive electrode;

impregnating the electrode assembly with an electrolyte;

activating the impregnated electrode assembly by performing a first charging on the impregnated electrode assembly;

removing gas generated in the activation;

discharging the activated electrode assembly immediately after removing the gas to produce a discharged electrode, wherein a state of charge of the discharged electrode is 30% or less after the discharging; and performing a second charging on the discharged electrode assembly, wherein the pre-lithiation is performed by charging the pre-lithiation cell so that a state of charge of the pre-lithiation cell following the charging is 5% to 30%.

3. The method of claim 2, wherein the first charging is performed by charging the electrode assembly so that a state of charge of the electrode assembly is greater than or equal to 40%.

4. The method of claim 2, wherein the first charging is performed while pressing the impregnated electrode assembly.

5. The method of claim 2, wherein the first charging is performed while pressing the impregnated electrode assembly with a pressure ranging from 0.2 kgf/cm$^2$ to 10 kgf/cm$^2$.

6. The method of claim 2, wherein a state of charge of the electrode assembly is not increased between the removing gas and the discharging.

7. The method of claim 2, wherein the impregnation is performed 15° C. to 30° C. for 12 hours to 100 hours.

8. The method of claim 2, further comprising standing the discharged electrode assembly.

9. The method of claim 8, wherein the standing is performed for a time ranging from 12 hours to 60 hours.

10. The method of claim 2, further comprising performing an additional discharging of the discharged electrode assembly following the second charging.

11. The method of claim 2, wherein the negative electrode comprises a negative electrode current collector and a negative electrode active material layer formed on the negative electrode current collector, wherein the negative electrode active material layer comprises a negative electrode active material, and the negative electrode active material comprises at least one selected from a carbon-based active material and a silicon-based active material.

12. The method of claim 2, wherein a state of charge of the discharged electrode is 10% or less after the discharging.

13. The method of claim 2, wherein a state of charge of the discharged electrode is 0% after the discharging.

* * * * *